UNITED STATES PATENT OFFICE 2,369,858

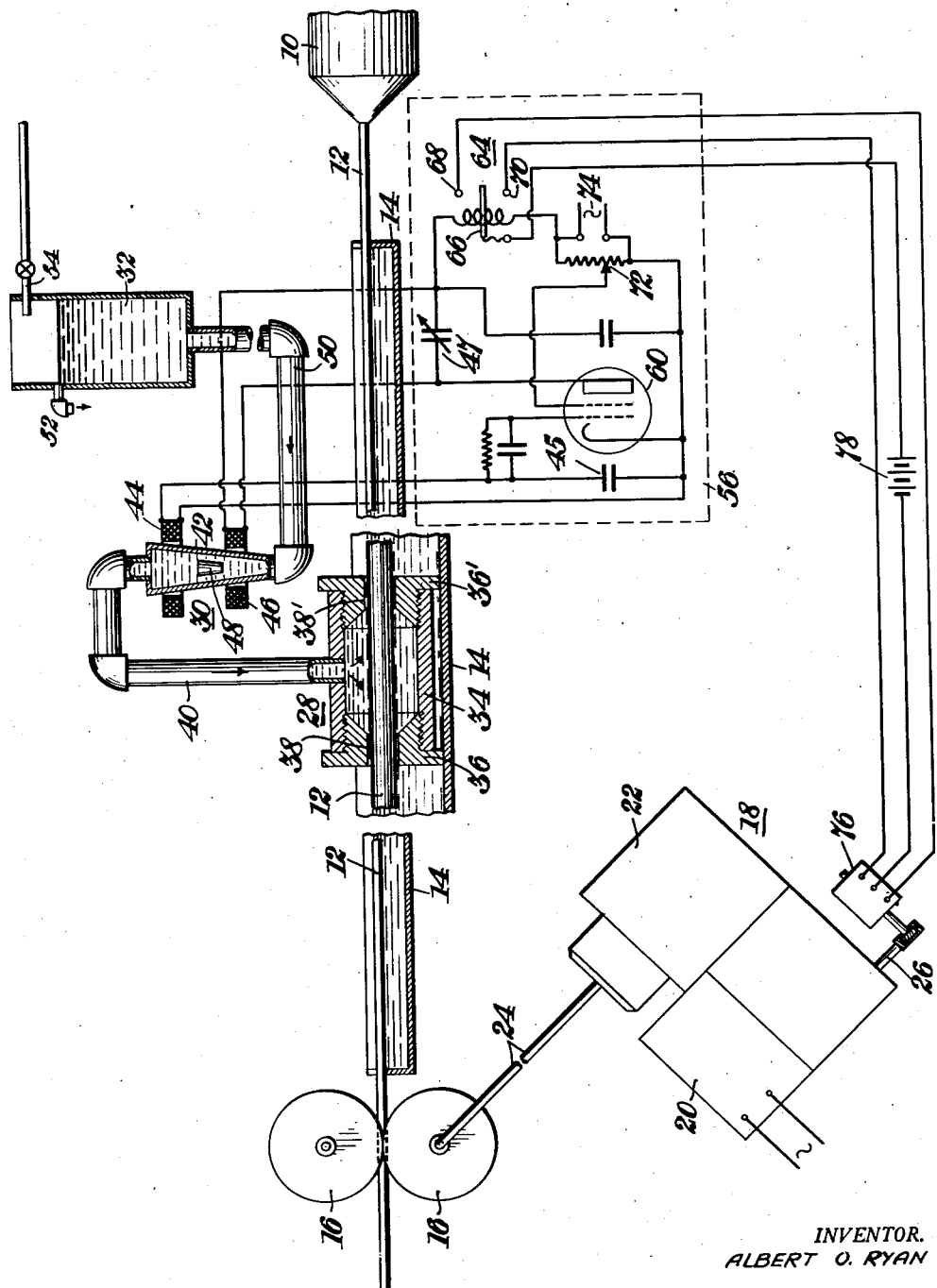
INVENTOR.
ALBERT O. RYAN

CABLE FORMING APPARATUS

Albert O. Ryan, River Edge, N. J., assignor to Federal Telephone and Radio Corporation, Newark, N. J., a corporation of Delaware Application March 26, 1943, Serial No. 480,703

11 Claims. (Cl. 18—13)

This invention relates to improvements in cable forming apparatus, and more particularly to an arrangement for controlling the size of insulated cable.

In cable forming apparatus of the type in mind, hot insulation is generally extruded about a wire core, the insulated cable then passing through a cooling trough from whence it is drawn by rollers or similar means and wound upon a reel. Despite the fact that the insulation may be extruded about the wire core at a constant rate and that the insulated cable is pulled from the extrusion head at a constant speed, variations in diameter of the final insulated cable still occur, and in certain instances where close tolerances are required, the resulting variations in diameter cause a large amount of cable to be discarded.

It is an object of the present invention to provide an arrangement for controlling the size of cable within narrow permissible limits.

It is a further object of the present invention to control the size of insulated cable by means which may be easily added to the usual cable forming apparatus now ordinarily used.

A still further object of the present invention is directed to providing an arrangement which simultaneously serves to control the cable size and serves as a cooling means for the hot extruded insulating material.

An additional object of the present invention is directed to an arrangement for controlling the speed at which the cable is extruded in accordance with the diameter of the extruded cable.

These and other features, capabilities and advantages of the invention will appear from the sub-joined detailed description of one specific embodiment thereof, illustrated in the accompanying drawing in which the single figure schematically illustrates the general lay-out of my controlling apparatus and includes a circuit diagram of a preferred form of electrical control circuit.

The usual cable forming apparatus includes an extrusion head 10 by means of which the insulating material is extruded about the wire core. The insulated cable 12 is drawn from the extruding head 10 through a cooling trough 14 by means such as rollers 16 grasping the far end of the formed cable. The rollers 16 pass the cable on to a suitable reel (not shown) and are driven by a suitable driving mechanism indicated at 18. This driving mechanism may consist of a motor 20 connected to a variable speed transmission 22 which, in turn, drives a shaft 24 connected to the rollers 16. The variable speed transmission 22 may be of any suitable well-known type, for example, of the conical pulley type in which a variation in speed is caused by a change in diameter of the conical pulleys effected by the rotation of a suitable control shaft 26. It is to be understood, however, that other types of variable speed transmissions are and may be used, and the principles of the present invention are applicable for use in connection with any desired variable speed arrangement which will permit relatively small speed changes.

In the apparatus now used and just described above, the insulated cable as at 12 as it comes through the extruder 10, is relatively hot and the insulation is quite soft. For this reason the cable passes through the cooling trough 14 which is usually filled with a continuous flow of cooling fluid such as water. In accordance with the present invention, I provide in this cooling trough 14, a cylindrical member 28 in the form of a hollow cylinder 34 into whose ends are attached bushings 36, 36' having respective openings 38, 38' of a diameter which is slightly larger than the desired diameter of the insulated cable. It is to be understood that the insulated cable 12 in passing through the trough 14 will pass through these openings 38, 38' to the pulling wheels 16 and preferably, due to the tension caused by the pulling action of the wheels 16, will pass substantially through the center of these openings. The cooling fluid for the cable, or at least part of the same, may now be supplied from a sump 32 having a constant head and through a control device 30, to be explained in more detail hereinafter, to the inside of the member 28. If the fluid such as the cooling water in sump 32 is at a constant pressure it will readily be apparent that the rate of flow from the sump to the device 28 is controlled, assuming the speed of the cable 12 is constant, by the size of the openings 38, 38' and will thus vary when the diameter of the cable passing through these openings varies. In other words, the rate of flow of the cooling fluid will be a measure of the size of the extruded cable.

The device 30 provides a means for measuring the rate of flow of the cooling water. This device preferably consists of a hollow inverted conical member 42, the small end of which is connected to the sump 32 while the large end is connected to the device 28. Induction coils 44 and 46 are positioned about opposed ends of the conical member 42 while a metal float 48 is so designed and so balanced that if the rate of flow of cooling fluid is relatively high, it will form a core within the coil 44, while if the rate is low it will drop to form a core within the coil 46. For the desired rate of flow corresponding to a desired cable size, the float 48 will take an intermediate position between the two coils. Since it is important that the rate of fluid flow be a measure solely of the size of the openings 38, 38' and thus the size of the cable 12, the pressure head upon the cooling fluid must be constant. This can readily be effected by providing the sump 32 with an outlet 52 at a predetermined level while cooling water may be supplied to the sump by a source indicated at 54. A suitable conduit 50 connects the sump 32 with the control device 30 while a conduit 40 leads from the device 30 to the device 28.

The action of the floating core 48 with respect to the coils 44 and 46 may be utilized in a control circuit generally indicated at 56. This control circuit embodies an electron discharge device, preferably a four element vacuum tube 60. The coil 44 forms with a condenser 45 a tuned grid circuit for the tube 60 while the coil 46 forms with the condenser 47 a tuned plate circuit. An output circuit from the tube 60 includes a current relay 64 while power is supplied to the electronic circuit from a suitable source 74. The response of the circuit may be adjusted by varying the position of a potentiometer 72 connected to a second control grid of the tube 60. The two tuned circuits which include the coils 44 and 46 are so dimensioned that when the float 48 rises, for example, to within the coil 44 the output current from the control circuit will be sufficiently great to move the arm 66 of the current relay 64 in one direction, while when the float 48 drops to within the coil 46, the output current will be sufficiently reduced to move the arm 66 in the opposite direction. When the float 48 is in its central position the arm 66 of the current relay 64 will remain at an intermediate position.

The control shaft 26 of the variable speed drive 22 may be rotated in one direction or another by a reversible motor 76 connected thereto through gearing 80. The reversible motor 76 may be controlled by the current relay 64 acting through the movable control arms 66 in connection with opposite contacts 68 and 70. In the form of invention schematically illustrated, when the arm 66 touches the contact 68, the positive side of the battery 78 or other source of power will be connected to one side of the motor 76, while if arm 66 touches the contact 70 this positive potential will be connected to another side of the winding of the motor 76. A central or neutral point between the windings from the motor 76 is connected to negative terminal of the battery 78. It will thus be seen that if, for example, the size of the cable 12 is greater than desired, the flow of fluid from the sump 32 out through the device 28 to the cooling trough 14 will be reduced and the float 48 will sink. When this sinks sufficiently to be within the coil 46, the tuned plate circuit of the tube 60 will cause a change in the output circuit resulting in an increase in output current so that the arms 66 may, for example, contact the contact 68. The motor 76 is energized in one direction so as to change the variable speed transmission in a manner to increase the speed of the pulling rollers 16. Since the cable is now drawn at a faster rate from the extruder 10, the size of the cable will be reduced and when this reduction is sufficient the flow of water through the device 30 will have sufficiently increased to raise the float 48, changing the tuned plate circuit so that the relay 64 on the output returns to its neutral position. A decrease in the size of the cable 12 causing an increase in the flow of cooling fluid with a raising of the float 48 will, in the same manner act through the control circuit 56 to rotate the motor 76 in the opposite direction and decrease the speed of pulling the cable from the extruder.

An advantage of the present invention which is of importance in properly controlling the size of the cable lies in the fact that since the cable is tensioned between the extruding head and the pulling rollers, the control device 28 may be positioned in the trough 14 relatively closely to the extruding head even though the extruded material at this point may be relatively hot and soft, since normally the soft cable will not come into contact with any portions of the device 28 or the edges of the openings, resulting in possible deformation of the cable. As a result, a change in size of cable is quickly detected and quickly compensated for in contrast to other proposed arrangements which require a contacting of the cable to determine its size and thus must be spaced relatively distant from the extrusion head where the insulating material has become hard.

While I have illustrated only one specific example of my proposed control arrangement, it will be at once obvious to those skilled in this art that other well-known control systems may be used in connection with the basic principles of this invention. For example, it has been previously pointed out that the specific type of variable speed control drive to be used in operating the pulling rollers is of no importance per se. Likewise, other electronic control circuits may be substituted for that described herein by way of example.

It is also pointed out that while, in the preferred embodiment illustrated, the size of cable is finally controlled by varying the speed at which the insulated cable is pulled from the extrusion head, the size of cable might also be controlled by varying the speed of the rotating extruding screw (not shown). It is preferable, however, that the size of cable be controlled in the manner described as a variation in the speed of the rotating extrusion screw is apt to vary the mechanical composition of the dielectric or insulant being extruded and will also vary the heating and the temperature of the extruded stock.

Accordingly, it is not intended that the present invention be limited to the precise form illustrated, but only as set forth in the objects of this invention and in the appended claims.

I claim:

1. In a system for forming insulated cables of the type in which insulation is extruded over a wire cable in an extrusion head and means are provided for pulling the insulated cable from the extrusion head, the combination of a closed hollow member having opposed openings in its opposite ends through which the insulated cable passes between the extrusion head and the pulling means, the size of said openings being slightly larger than the desired diameter of insulated cable, means for supplying a fluid under constant pressure to said member, whereby the rate of flow of said fluid is dependent upon the amount of fluid escaping from said member through said openings as determined by the size of the cable passing therethrough, variable means for controlling the speed of said cable pulling means, and means responsive to the rate of fluid flow for varying said speed control means.

2. The combination according to claim 1, in combination with a cable-cooling trough containing said cable, and positioned intermediate said extrusion head and said pulling means and supporting said hollow member, and in which the fluid supplied to said member is a cooling liquid.

3. The combination according to claim 1, in which said last means includes an electron discharge device having an anode, a cathode and a grid, means forming a tuned oscillatory circuit connected to said grid, means forming a tuned oscillatory circuit connected to said anode, a source of power for said electron discharge device, an output circuit connected to said electron discharge device, means in said output circuit for controlling said variable speed control means, and means responsive to the rate of fluid flow to said member for controlling said tuned circuits.

4. In an insulated cable forming apparatus of the type in which a pulling means operated by a motor through a variable speed drive pulls an insulated cable from an insulation extrusion head, the combination of a closed hollow member having opposed openings in its opposite ends through which the insulated cable passes between the extrusion head and the pulling means, the size of said openings being slightly larger than the desired diameter of insulated cable, a source of fluid under constant pressure connected to said member, whereby the rate of flow of said fluid is dependent upon the amount of fluid escaping through said openings as determined by the size of said cable passing therethrough, and means responsive to the rate of fluid flow for controlling said variable speed drive whereby the size of said cable is maintained substantially constant.

5. The combination according to claim 4, in combination with a cable-cooling trough containing said cable, and positioned intermediate said extrusion head and said pulling means and supporting said hollow member, and in which the fluid supplied to said member is a cooling liquid.

6. The combination according to claim 4, in which said last means includes an electron discharge device having an anode, a cathode and a grid, means forming a tuned oscillatory circuit connected to said grid, means forming a tuned oscillatory connected to said anode, a source of power for said electron discharge device, an output circuit connected to said electron discharge device, means in said output circuit for controlling said variable speed drive, and means responsive to the rate of fluid flow to said member for controlling said tuned circuits.

7. In an insulated cable forming apparatus of the type in which a pulling means operated by a motor through a variable speed drive pulls an insulated cable from an insulation extrusion head, the combination of a closed hollow member having opposed openings in its opposite ends through which the insulated cable passes within the extrusion head and its pulling means, the size of said openings being slightly larger than the desired diameter of insulated cable, a source of fluid under constant pressure connected to said member, whereby the rate of flow of said fluid is dependent upon the amount of fluid escaping through said openings as determined by the size of said cable passing therethrough, means forming a vertical inverted hollow conical chamber, means for connecting said constant pressure source to the lower end of said chamber, means for connecting the upper end of said chamber to said hollow member, a metal float in said chamber whose height is controlled by the flow of fluid through said chamber, a pair of coils respectively positioned about the top and bottom of said chamber, an electron discharge device having an anode, a cathode and a grid, means including one of said coils forming a first tuned oscillatory circuit connected to the grid of said electron discharge device, means including the other of said coils forming a second tuned oscillatory circuit connected to the anode of said electron discharge device, a source of power for said electron discharge device, an output circuit connected to said electron discharge device, and means in said output circuit for controlling said variable speed drive whereby the size of said cable is maintained substantially constant.

8. The combination according to claim 7, in which said last means includes a single-pole double-throw relay in said output circuit, a reversible motor drivably connected to said variable speed drive, a source of power for said reversible motor, and conductors interconnecting the contacts of said relay with said reversible motor and its source of power.

9. The combination according to claim 7, in combination with a second grid for said electron discharge device, and variable means for controlling the energization of said second grid to control the effect of said tuned circuits upon the output circuit.

10. The combination according to claim 7, in combination with a cable-cooling trough containing said cable, and positioned intermediate said extrusion head and said pulling means and supporting said hollow member, and in which the fluid supplied to said member is a cooling fluid.

11. The combination according to claim 1 in combination with a cable cooling trough, said trough being positioned to extend beyond said opposed openings whereby said fluid after escaping from said hollow member discharges into said trough and serves as a cooling liquid.

ALBERT O. RYAN.